Feb. 6, 1940.  R. J. ANSCHICKS  2,189,159
CONNECTING CLEAT FOR STRUCTURAL ELEMENTS
Filed Jan. 14, 1937  2 Sheets-Sheet 1
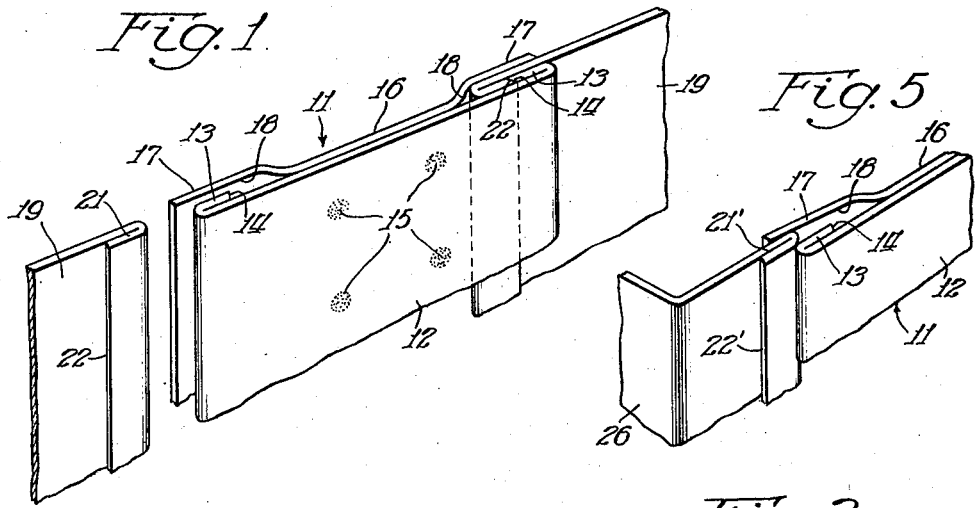
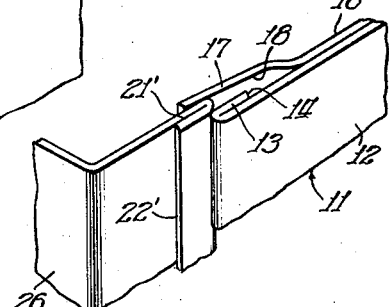
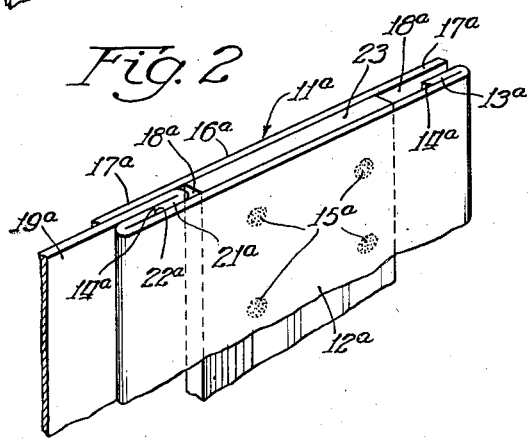
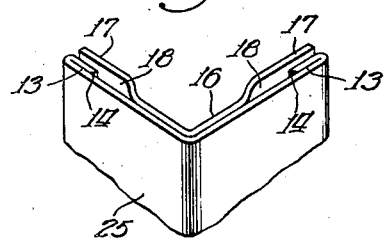
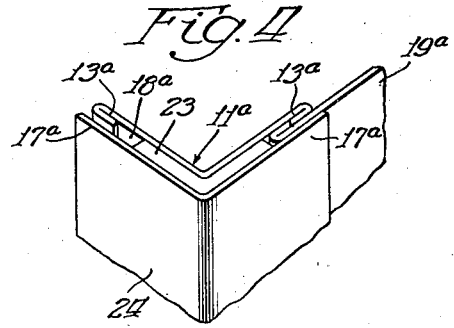
Inventor:
Rudolph J. Anschicks

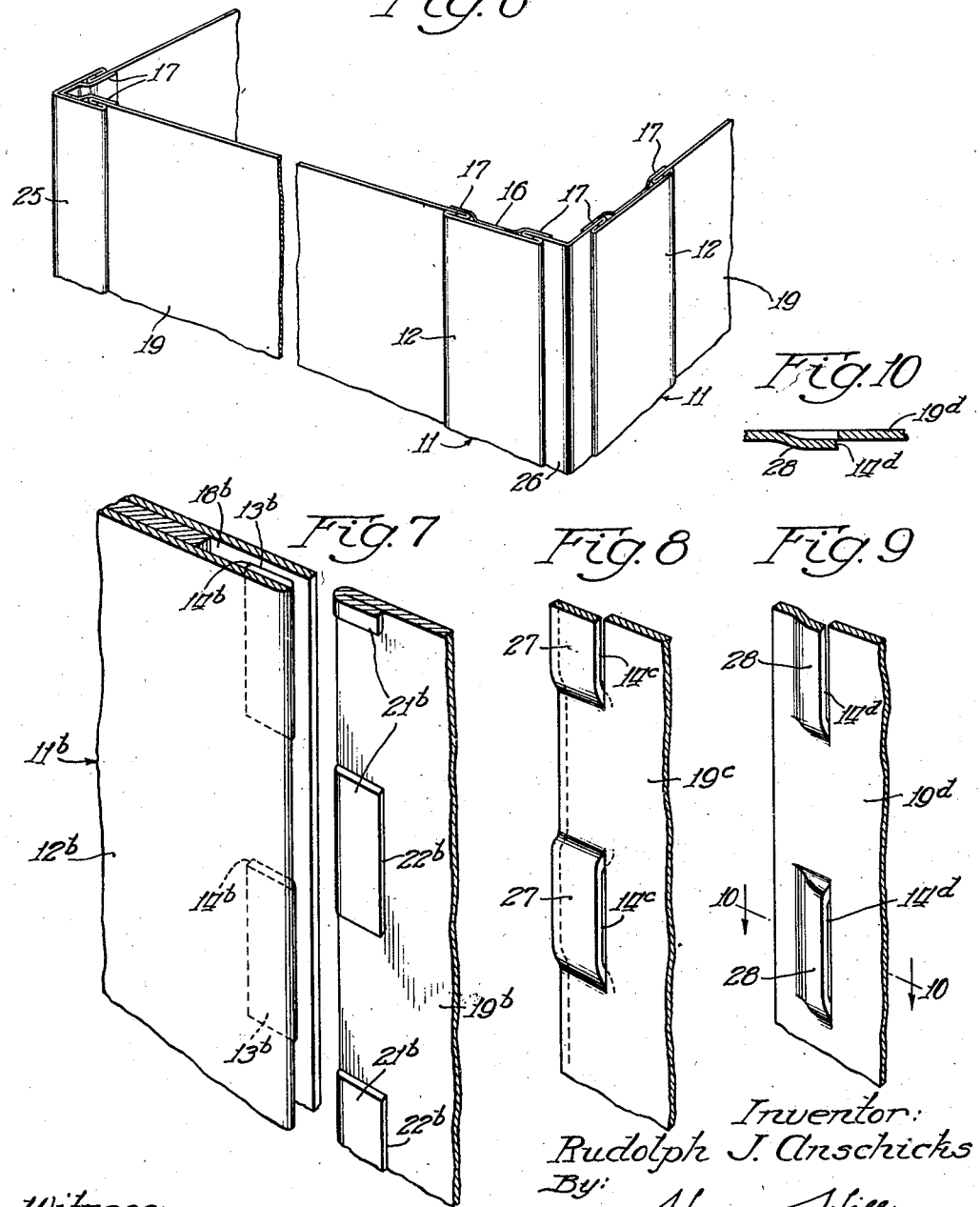

Patented Feb. 6, 1940

2,189,159

UNITED STATES PATENT OFFICE 2,189,159

CONNECTING CLEAT FOR STRUCTURAL ELEMENTS

Rudolph J. Anschicks, Chicago, Ill., assignor to Protectoseal Company of America, Inc., Chicago, Ill., a corporation of Illinois Application January 14, 1937, Serial No. 120,532

8 Claims. (Cl. 189—36)

This invention relates to connecting cleats or joints, and particularly to a novel construction and arrangement for connecting and securing portions of sheet metal structures together.

One object of the present invention is to provide novel cooperating means adjacent the respective edge portions of structural elements whereby the elements may be readily and conveniently connected and secured together without the aid of additional connecting or securing means.

Another object of the invention is to provide a structure wherein the connecting and securing means are formed as a substantially integral part of the respective structural elements.

Another object of the invention is to provide a novel construction and arrangement of cooperating structural elements whereby tension or stresses tending to separate the elements will be exerted substantially in the plane of the respective elements.

A further object of the invention is to provide novel cooperating means on the respective structural elements whereby adjacent connected portions of the respective elements may be conveniently and readily disconnected and separated.

A still further object of the invention is to improve devices of the character described in sundry details hereinafter referred to and particularly pointed out in the appended claims.

Various forms or embodiments of which the present invention is susceptible are shown for illustrative purposes in the accompanying drawings, in which:

Fig. 1 is a fragmentary perspective view of one form of my improved connecting cleat showing a structural element in cooperative relationship with respect to one edge thereof, and a second structural element disconnected from the opposite edge of the cleat;

Fig. 2 is a fragmentary perspective view of a slightly modified form of cleat construction showing a structural element operatively related to one edge thereof;

Fig. 3 is a fragmentary perspective view of a corner cleat of a structure similar to that shown in Fig. 1;

Fig. 4 is a fragmentary perspective view of a corner cleat of a structure similar to that shown in Fig. 2;

Fig. 5 is a fragmentary perspective view of a corner connector and cooperating cleat illustrating the manner of connecting the adjacent edges of the corner piece and cleat together;

Fig. 6 is a fragmentary perspective view of a plurality of structural elements illustrating the use of cleats and corner connectors of the character illustrated in Figs. 1, 3 and 5;

Fig. 7 is a fragmentary perspective view of a further modified form of cleat and structural element adapted for cooperative relationship with respect thereto;

Figs. 8 and 9 are fragmentary perspective views illustrating different types of shoulders formed on structural elements adapted to cooperate with my improved type of cleat; and Fig. 10 is a fragmentary transverse sectional plan view taken substantially as indicated by the line 10—10 of Fig. 9.

Referring particularly to Fig. 1 of the drawings, my improved type of cleat shown therein and indicated, as a whole, by the numeral 11, comprises, in the present instance, a strip 12 formed preferably of sheet metal and having its vertical edge portions folded back upon itself as indicated at 13, to provide, preferably, slightly beveled shoulders 14 spaced inwardly from the edges of the strip, and secured to the strip 12 as, for example, by spot-welding indicated at 15, and preferably adjacent the central portion of the strip is a cooperating member 16, having its outer edge portions 17 extending substantially to the edges of the strip 12 and off-set laterally with respect to the body portion of the member 16, in a manner to provide a retaining member and form a recess 18 adjacent the respective opposite edge portions of the cleat 11 adapted to receive, respectively adjacent edge portions of structural elements 19 having their respective edge portions folded back upon themselves as indicated at 21 to provide, preferably, slightly beveled shoulders 22 adapted to cooperate with the shoulders 14 formed on the strip 12 and in a manner to conveniently connect and secure the cleat 11 and structural elements 19 together, the portions or members 17 acting to retain the shoulders 14 and 22 in cooperative relationship with respect to each other, it being understood that the resilient character of the material employed in the member 16 will permit of the insertion of the folded edge portions 21 of the structural elements 19 into the recess in the manner illustrated in Fig. 5.

The structure illustrated in Fig. 2 contemplates a cleat 11a comprising a strip 12a formed with inturned edge portions 13a to provide shoulders 14a spaced inwardly from the edges of the strip 12a in substantially the same manner described with reference to Fig. 1, and secured to the strip 12a adjacent the central portion preferably by means of spot welding, indicated at 15a, is a spacer 23, to the opposite face of which is secured a cooperating member 16a having its opposite edge portions 17a extending beyond the outer edge portions of the spacer 23 and cooperating therewith and with the edge portions of the strip 12a to provide recesses 18a adjacent the respective edge portions of the cleat 11a, the recesses 18a being adapted to receive the edge portions of structural members 19a in a manner to position the folded portion 21a and shoulder 22a thereof in operative engagement with the shoulders 14a formed on the strip 12a.

Fig. 3 illustrates a corner cleat 25 of a structure substantially like that illustrated in the cleat 11 shown in Fig. 1, except that the cleat is bent at substantially right angles along a line extending longitudinally of the cleat approximately adjacent the central portion thereof.

Fig. 4 illustrates a corner cleat 24 of a structure substantially like that illustrated in the cleat 11a shown in Fig. 2, except that the cleat is bent at substantially right angles along a line extending longitudinally of the cleat approximately adjacent the central portion thereof.

Fig. 5 illustrates the manner of connecting a cleat 12 with a structural corner element 26 of angular construction by inserting the folded edge portion 21' of the element 26 between the folded portion 13 of the cleat 12 and the cooperating portion 17 of the member 16, the insertion being made possible by the resiliency of the portion 17 which enables the positioning of the folded portion 21' of the element 26 in the recess 18, and positioning the portion 22' in engagement with the shoulder 14 of the cleat as illustrated at one side of Fig. 1.

In Fig. 6 is illustrated a fragment of a closure employing the structures illustrated in Figs. 1, 3 and 5, the near corner element being disclosed as of the character indicated at 26 in Fig. 5, and in the other corner is a corner cleat 25 of the character shown in Fig. 3, while the flat cleats 11 are of the character indicated at 11 in Fig. 1.

In Fig. 7 is shown the adjacent or cooperating portions of a joint employing a cleat 11b and a structural element 19b, the cleat 11b comprising a strip 12b and being substantially like the cleat illustrated in Fig. 2, except that the folded edge portion 13b of the strip 12b comprises a plurality of longitudinally spaced portions providing longitudinally spaced shoulders 14b at spaced intervals along the edge of the strip 12b, while the structural element 19b is provided with a plurality of folded portions 21b longitudinally spaced along the edge of the element 19b and forming shoulders 22b adapted to engage and cooperate with the shoulders 14b of the cleat 11b.

In the construction shown in Fig. 7, the portions 21b of the element 19b are of slightly less length than the space between adjacent edges of the folded portions 13b of the strip 12b, and the spaces between adjacent edges of the folded portions 21b are slightly greater than the length of the portions 14b on the cleat 11b, thereby providing a structure whereby the folded portions 21b may be inserted into the recess 18b by passing the portions 21b between the portions 14b of the cleat 11b and when the edge portion of the element 19b is seated in the recess 18b, the cleat 11b and structural element 19b may be shifted longitudinally with respect to each other to position the shoulders 22b and 14b in operative engagement with each other. By such an arrangement it will be apparent that the cleat 11b and element 19b may also be disconnected from each other by merely positioning the respective portions 21b of the element 19b in register with the spaces between the portions 13b of the cleat 11b and then by moving the edge portions of the cleat and structural element laterally with respect to each other, the portions of the joint may be disconnected without the necessity of shifting the structural element or cleat the full length of the cooperating structure.

Fig. 8 illustrates the manner of forming shoulders 14c adjacent the edge portion of a structural element 19c by striking up spaced edge portions of the element as illustrated at 27.

Figs. 9 and 10 illustrate the manner of forming a shoulder 14d on a structural element 19d by striking up portions thereof spaced inwardly from the adjacent edge portion of the element as indicated at 28, thereby providing structures which may be used in lieu of the folded edge portions of the structural members illustrated in the other figures of the drawings.

It will be observed from the foregoing description that the present invention provides novel cooperating means adjacent the respective edge portions of structural elements whereby the elements may be readily and conveniently connected and secured together without the aid of additional connecting or securing means. Also, that the present invention provides novel cooperating means whereby the respective elements may be conveniently and readily disconnected or separated if so desired.

Obviously, the present invention is not limited to the precise construction and arrangement shown and described as the same may be variously modified. Moreover, all the features of the invention need not be used conjointly as the same may be used to advantage in variously different combinations and subcombinations.

What I claim as new and desire to secure by Letters Patent is:

1. A connecting cleat and joint comprising a strip having beveled edge portions and having its opposite edge portions folded back upon itself to provide beveled shoulders closely adjacent and on one side of said strip adjacent opposite edge portions thereof and spaced inwardly therefrom, a cooperating member permanently secured adjacent its central portion to said strip and having yieldable edge portions offset from the body of the member and spaced from said shoulders, said yieldable offset portions cooperating with said strip to provide recesses adjacent the respective edge portions of the strip, and a structural element having an edge portion engageable with one of said recesses, said edge portion of the element being beveled and folded back upon itself to provide a beveled shoulder closely adjacent and on one side thereof and spaced inwardly from the edge of the element, said beveled shoulder on the structural element being engageable with one of the beveled shoulders on said strip for securing the adjacent edge portions of the strip and element together.

2. A connecting cleat and joint comprising a strip having its opposite edge portions folded back upon itself to provide shoulders on one side of said strip adjacent opposite edge portions thereof and spaced inwardly therefrom, a spacer secured to said strip at said one side thereof and having the edge portions of the spacer positioned inwardly from the edges of said strip and shoulders, and a cooperating member secured adjacent its central portion to said spacer and having edge portions extending beyond the edges of said spacer and spaced from said shoulders, said extending edge portions cooperating with said strip and spacer to provide recesses adjacent the respective edge portions of the strip, and a plate having an edge portion engageable with one of said recesses, said edge portion of the plate being folded back upon itself to provide a shoulder spaced inwardly from the edge of the plate and engageable with one of the shoulders on said strip for securing adjacent edge portions of the strip and plate together.

3. A connecting cleat and joint comprising a substantially flat strip having longitudinally spaced portions of its opposite edge portions folded back upon itself to provide longitudinally spaced shoulders on one side thereof adjacent opposite edge portions of the strip and spaced inwardly therefrom, a spacer secured to said strip at said one side thereof adjacent its central portion and having the edge portions of the spacer positioned inwardly from the edges of said strip and shoulders, a cooperating member secured adjacent its central portion to said spacer and having edge portions extending beyond the edges of said spacer and spaced from said shoulders, said extending edge portions cooperating with said strip and spacer to provide recesses adjacent the respective edge portions of the strip, and a plate having an edge portion engageable with one of said recesses, said edge portion of the plate having longitudinally spaced portions folded back upon the body of the plate to provide longitudinally spaced shoulders spaced inwardly from the edge of the plate and engageable with the longitudinally spaced shoulders on said strip, the length of the respective longitudinally spaced shoulders on said plate being slightly less than the space between adjacent ends of the shoulders on said strip, and the space between adjacent ends of the shoulders on said plate being slightly greater than the length of the respective shoulders on said strip.

4. A connecting cleat and joint comprising a substantially flat strip having longitudinally spaced portions of its opposite edge portions folded back upon itself to provide longitudinally spaced shoulders on one side thereof adjacent opposite edge portions of the strip and spaced inwardly therefrom, a cooperating member operatively connected adjacent its central portion to said strip and in relatively fixed position with respect thereto, said member having edge portions extending beyond and spaced from said shoulders, said extending edge portions cooperating with said strip to provide recesses adjacent the respective edge portions thereof, and a plate having an edge portion engageable with one of said recesses, said edge portion of the plate having longitudinally spaced portions folded back upon the body of the plate to provide longitudinally spaced shoulders spaced inwardly from the edge of the plate and engageable with the longitudinally spaced shoulders on said strip, the length of the respective longitudinally spaced shoulders on said plate being slightly less than the space between adjacent ends of the shoulders on said strip, and the space between adjacent ends of the shoulders on said plate being slightly greater than the length of the respective shoulders on said strip.

5. A connecting cleat and joint comprising, in combination, a strip having its opposite edge portions relatively removed from each other and folded back upon itself to provide spaced shoulders adjacent one side of said strip and spaced inwardly from the respective opposite edge portions thereof, a cooperating member having a central body portion engaging said strip a substantial distance inwardly from said shoulders and permanently secured to said strip adjacent the central portion thereof, said cooperating member having yieldable edge portions offset from the plane of the body portion thereof and spaced respectively from the edge portions of said strip to provide a recess adjacent the respective edge portions of the cleat, and a structural element having longitudinally spaced struck-up portions positioned inwardly from one of its edges and disposed laterally from the plane of the body portion of said element to provide longitudinally spaced shoulders positioned inwardly from the edge of said element and adapted to enter said recess and engage the shoulders of said strip.

6. A connecting cleat and joint comprising a substantially flat strip having longitudinally spaced portions of its opposite edge portions folded back upon itself to provide longitudinally spaced shoulders on one side thereof adjacent opposite edge portions of the strip and spaced inwardly therefrom, a cooperating member operatively connected adjacent its central portion to said strip and in relatively fixed position with respect thereto, said member having edge portions extending beyond and spaced from said shoulders, said extending edge portions cooperating with said strip to provide recesses adjacent the respective edge portions thereof, and a plate having an edge portion engageable with one of said recesses, said edge portion of the plate having longitudinally spaced struck-up portions providing longitudinally spaced shoulders spaced inwardly from the edge of the plate and engageable with the longitudinally spaced shoulders on said strip, the length of the respective longitudinally spaced shoulders on said plate being slightly less than the space between adjacent ends of the shoulders on said strip and the space between adjacent ends of the shoulders on said plate being slightly greater than the length of the respective shoulders on the said strip.

7. A connecting cleat and joint comprising a substantially flat strip having longitudinally spaced shoulders on one side thereof adjacent opposite edge portions of the strip and spaced inwardly therefrom, a cooperating member operatively connected adjacent its central portion to said strip and in relatively fixed position with respect thereto, said member having edge portions extending beyond and spaced from said shoulders, said extending edge portions cooperating with said strip to provide recesses adjacent the respective edge portions thereof, and a plate having an edge portion engageable with one of said recesses, said edge portion of the plate having longitudinally spaced struck-up portions providing longitudinally spaced shoulders spaced inwardly from the edge of the plate and engageable with the longitudinally spaced shoulders on said strip, the length of the respective longitudinally spaced shoulders on said plate being slightly less than the space between adjacent ends of the shoulders on said strip and the space between adjacent ends of the shoulders on said plate being slightly greater than the length of the respective shoulders on the said trip.

8. A connecting cleat comprising a strip having infolded edge portions to provide shoulders, a spacer secured to said strip on the shouldered side thereof, the edge portions of the spacer terminating inwardly from the shouldered edges of the strip, and a cooperating member secured adjacent its central portion to said spacer and having resilient edge portions spaced from said shoulders and cooperating with said strip and spacer to provide a recess adjacent the respective edge portions of the strip.

RUDOLPH J. ANSCHICKS.